United States Patent [19]

Winicov et al.

[11] E Re. 28,778

[45] Reissued Apr. 20, 1976

[54] PHENOLIC SYNTHETIC DETERGENT-DISINFECTANT

[75] Inventors: Murray W. Winicov, Flushing; William Schmidt, Sea Cliff, both of N.Y.

[73] Assignee: West Laboratories, Inc., Long Island City, N.Y.

[22] Filed: Apr. 2, 1975

[21] Appl. No.: 564,316

Related U.S. Patent Documents

Reissue of:

[64] Patent No.: 3,824,190
Issued: July 16, 1974
Appl. No.: 348,112
Filed: Apr. 5, 1973

U.S. Applications:

[63] Continuation-in-part of Ser. No. 205,346, Dec. 6, 1971, abandoned, which is a continuation of Ser. No. 887,748, Dec. 23, 1969, abandoned.

[52] U.S. Cl. ..... 252/106; 424/346; 424/347

[51] Int. Cl.[2] ..... C11D 3/48

[58] Field of Search ..... 252/106, 107; 424/346, 424/347

[56] References Cited

UNITED STATES PATENTS

| | | | |
|---|---|---|---|
| 1,980,966 | 11/1934 | Blicke | 424/347 |
| 2,572,855 | 10/1951 | Guy | 424/346 |
| 2,802,881 | 8/1957 | Rickert | 424/347 |
| 3,002,883 | 10/1961 | Butt et al. | 252/106 |
| 3,215,596 | 1/1965 | Moyle et al. | 424/346 |
| 3,257,273 | 6/1966 | Shambaugh et al. | 424/347 |
| 3,538,217 | 11/1970 | Dewar et al. | 424/173 |
| 3,558,495 | 1/1971 | Mace | 252/90 |
| 3,671,644 | 6/1972 | Irani et al. | 252/106 |

FOREIGN PATENTS OR APPLICATIONS

| | | | |
|---|---|---|---|
| 789,713 | 1/1958 | United Kingdom | 424/346 |
| 872,900 | 7/1961 | United Kingdom | 424/347 |
| 927,255 | 5/1963 | United Kingdom | 424/347 |

*Primary Examiner*—P. E. Willis, Jr.
*Attorney, Agent, or Firm*—Howard E. Thompson, Jr.

[57] ABSTRACT

Unique and novel phenolic synthetic detergent-disinfectant compositions are provided wherein the detergent component is an anionic detergent and the phenolic components thereof consist essentially of ortho phenylphenol in admixture with high activity and intermediate activity phenolics, the ratio of ortho phenylphenol to the high and intermediate activity phenolics being from about 4:1–1.1:1. When prepared as a use dilution, the ortho phenylphenol is present in an amount of at least about 450 p.p.m.

When the ortho phenylphenol is employed only with the high activity phenolics, the preferred minimum amount of ortho phenylphenol should be at least about 600 p.p.m. and the ratio of the ortho phenylphenol to the high activity phenolics can then be from about 2.5:1–1.5:1 and, when used with intermediate activity phenolics at the same preferred minimum level, the ratio of the ortho phenylphenol to the intermediate activity phenolics can be from about 2.1:1–1.25:1

The novel phenolic synthetic detergent-disinfectant compositions of the invention are effective not only against Staphylococcus and Salmonella but also against the troublesome Pseudomonas species in hard water.

16 Claims, No Drawings

PHENOLIC SYNTHETIC DETERGENT-DISINFECTANT

Matter enclosed in heavy brackets [ ] appears in the original patent but forms no part of this reissue specification; matter printed in italics indicates the additions made by reissue.

*This is an application for reissue of U.S. Pat. No. 3,824,190 issued July 16, 1974, which* [This application] is a continuation-in-part of application Ser. No. 205,346, filed Dec. 6, 1971, now abandoned, which in turn is a continuation of application Ser. No. 887,748, filed Dec. 23, 1969, now abandoned.

This invention relates to novel phenolic synthetic detergent-disinfectant compositions which contain anionic detergent and a mixture of phenolics, the phenolic mixture consisting essentially of ortho phenylphenol, and the other phenolics in the mixture being members selected from the class consisting of high activity and intermediate activity phenolics. This invention further relates to novel phenolic synthetic detergent-disinfectant compositions which are effective not only against Staphylococcus and Salmonella but also against the troublesome pseudomonas species in hard water.

BACKGROUND OF THE INVENTION

The use of phenolics as disinfectants is well established in the art, such as is represented by U.S. Pats. 1,980,966 to Blocke; 2,572,855 to Guy; 2,802,881 to Rickert; 3,002,883 to Butt et al.; 3,215,596 to Moyle et al.; and 3,257,273 to Shambough et al., as well as by British Pats. 789,713 to Schuelke and Mayr; 872,900 to pearson et al.; 927,255 to Wright; and 1,150,966 to Bondy et al. As can be seen from this representative sampling of the prior art, phenolic disinfectants are generally comprised of mixtures of substituted phenols solubilized with alkali, anionic detergents, soaps and the like and, in addition, frequently contain alkaline phosphates, small amounts of a chelating agent, solvents, perfumes and the like. For example, the British Patent to Wright (927,255) discloses utilizing ortho phenylphenol with other phenols in compositions which contain soap as the detergent, the detergent being derived from the saponification of castor oil with potassium hydroxide to obtain potassium ricinoleate. This patent also discloses the use of oleic acid to react with excess alkali.

British Pat. 1,150,966 to Bondy et al. also reveals the use of ortho phenylphenol in admixture with other phenolics to provide a solid composition in tablet form which is intended for use, after being dissolved in water, as a household detergent, such as for dishes.

The above two British prior art references have been singled out as they ostensibly appear to reflect the concepts of this invention. It is important to bear these references in mind for it will be seen, as revealed in more detail hereinafter, that the presence of soap is detrimental to the function of the disinfectant of the invention and that unless one employs only particular types of phenols with ortho phenylphenol and these types only at the proper levels, the effectiveness of the phenolic disinfectant of the invention against Staphylococcus, Salmonella and particularly the troublesome Pseudomonas species in hard waters will not be achieved.

It is also well known to those skilled in the art that the inclusion of small amounts of an anionic detergent will aid in the performance of these phenolic disinfectants but that higher ratios of the detergent to the phenolics interferes with their effectiveness. It is further known that the alkali content of these phenolic disinfectant compositions has to be controlled so that the pH of the use dilutions prepared therefrom is not significantly higher than the pK of the phenolics employed in the disinfectant composition.

More recently, phenolic disinfectant compositions have been comprised of high activity phenolics alone or of mixtures of high activity phenolics with intermediate or low activity phenolics.

A good general survey of phenolic compounds has been presented by R. F. Prindle and E. S. Wright in Disinfection, Sterilization and Preservation by Lawrence and Block, Lee and Febiger, Philadelphia, 1968.

For purposes of this invention, the term "phenol coefficient," as employed throughout the application and in the appended claims, should be understood as being based upon the following definitions: a high activity phenolic is one having a phenol coefficient of about 150 or higher at temperatures of from about 20° C. to 37° C. against S. aureus. Similarly, an intermediate activity phenolic is one having a phenol coefficient of from about 25 to 150, and a low activity phenolic is one having a phenol coefficient of less than 25; the phenol coefficient being obtainable by the methods set forth in the Methods of Analysis of the Association of Official Agricultural Chemists (AOAC), 10th Edition.

The disinfectant activity of disinfectants is determined and measured by the official USDA test as described on pages 82–84 of the AOAC, 10th edition, hereinafter referred to and identified as the Use Dilution Confirmation (UDC) test, and is employed to test disinfectants which are miscible with water to confirm phenol coefficent results, and to determine maximum dilutions that are effective for practical disinfection. In general, the test involves providing an organism to be tested, such as S. aureus, S. choleraesuis, Pseudomonas aeruginosa and the like, and preparing sterilized ring carriers. The ring carriers are placed into contact with the organism to be tested and are then placed on a petri dish to allow the organism to dry as a film on the ring. The contaminated carriers are then placed in a solution of the germicide to be tested for a 10 minute exposure interval and the results are reported in groups of 10 rings.

The disinfectant activities are reported at the recommended dilution of the germicides being tested against S. aureus, S. choleraesuis, and Pseudomonas aeruginosa; distilled water is specified to dilute the germicidal products. However, hard water can be used as the diluting medium in addition to distilled water, and if pass results are obtained, additional efficacy claims can be made for the product.

Generally, commercially available phenolic disinfectant compositions fail against Pseudomonas organisms in waters containing as little as 100 p.p.m. AOAC hardness and even fail in city water that is ordinarily considered to be "soft"; that is, having an AOAC hardness of as little as about 50 p.p.m. Consequently, the claimed activity of these phenolic disinfectant products against Pseudomonas organisms cannot be completely relied upon to actually disinfect against Pseudomonas organisms under actual use conditions unless they are specifically guaranteed for use in water other than distilled water.

It is known that ortho phenylphenol has a relatively low phenol coefficient and is, therefore, relatively ineffective against S. aureus and S. choleraesuis. However, ortho phenylphenol is about as effective, on a weight basis, against Pseudomonas organisms as are the high activity phenolics. Since the solubility characteristic of a phenolic in a use dilution limits the amount of any one phenolic that can be incorporated in a product, it has been the practice to include some ortho phenylphenol in product formulations in order to enhance the performance of these products against Pseudomonas. However, the ortho phenylphenol content is usually kept below the total amount of other phenolics present in the product and, rarely has it been increased to a level approximately equal to that of the other phenolics present. It has been possible, therefore, to provide compositions containing, in use dilution, about 500 p.p.m. or more of combined high activity phenolics and ortho phenylphenol, plus a small amount of a chelating agent, which are effective against Pseudomonas in distilled water.

In attempting to formulate products that would pass against Pseudomonas in hard water, however, a different problem has been encountered. Attempts to increase the amount of high activity phenolic or decrease the recommended dilution were not effective since the solubility limit of the phenolic was reached before enough high activity or intermediate activity phenolics could be added to accomplish the desired result. Increasing the amount of ortho phenylphenol at the expense of the other phenolics was also found to be ineffective since the amount needed to disinfect against Pseudomonas would still be inadequate against other test organisms such as Staphylococcus and Salmonella.

THE INVENTION

In the phenolic synthetic detergent-disinfectant compositions of the present invention, it has been found that ortho phenylphenol can be combined with high activity and/or intermediate activity phenols to provide effective disinfectant action against Pseudomonas as well as against Staphylococcus and Salmonella organisms. When provided in a use dilution, the level at which the phenolic disinfectant of the invention becomes effective is when there is present therein at least about 750 p.p.m. total phenolics of which ortho phenylphenol comprises at least about 450 p.p.m. When provided as a composition to be diluted for use, for example, in the ratio of one ounce of composition in one gallon of water, the amount of total phenolics that should be present, based upon the total weight of the composition, should be at least about 9.6% by weight of which at least about 5.75% by weight is ortho phenylphenol. Whether in the form of a use dilution or composition, the weight ratio of ortho phenylphenol to the high activity and/or intermediate activity phenolics present can range from about 4:1–1.1:1. At these levels of high activity and/or intermediate activity phenolics and minimum amounts of ortho phenylphenol, there is established a "threshold of effectiveness" above which added amounts of intermediate activity or high activity phenolics will aid in their performance against Pseudomonas in hard water, but below which the same phenolics will not contribute significantly to their effectiveness against Pseudomonas in hard water. On the other hand, there is no comparable threshold of effectiveness for ortho phenylphenol against Pseudomonas in distilled water. In distilled water there is essentially an additive effect which governs the efficacy of a combination of phenolics whether or not the phenolics contain ortho phenylphenol at any level.

When employed in distilled water containing a trace of a chelating agent, as little as 500 p.p.m. ortho phenylphenol could give consistent pass results against Pseudomonas aeruginosa. However, when the same level of ortho phenylphenol is used in hard waters containing from 50 p.p.m. to 500 p.p.m. hardness, consistent failures are encountered. Even when the ortho phenylphenol level is raised to about 600 p.p.m., generally unsatisfactory results are obtained in hard water.

The results discussed and described hereinabove were determined according to the previously identified UDC test. While these results were determined according to the same test, it should be appreciated that the conditions of this test are not exactly reproducible from one laboratory to another, even over long runs, since the average of positive tubes for a given test dilution may vary slightly. Taking this into account, the UDC test results reported hereinafter are based upon the following assigned valuations:

ASSIGNED VALUATIONS (a) "0"—denotes no more than one (1) positive tube in sixty (60).

(b) "0–1"—denotes a long term average of less than one (1) positive tube out of ten (10).

(c) "1–10"—denotes a long term average of more than one (1) positive tube out of ten (10).

Although the official AOAC procedure identified earlier states that no more than 1 positive tube in 60 will give the prescribed kill with a confidence limit of 95%, variations in individual laboratory test procedures and consequent results can give rise to conditions wherein a "b"type result can occasionally be reflected as an "a" result. In view of this, those compositions which support a "b"type result are considered as being acceptable. With these considerations in mind, the results discussed and described hereinabove are tabulated below wherein the use dilution contained the indicated levels of ortho phenylphenol and, as a celating agent, a small amount (25 p.p.m.) of ethylenediamine tetraacetic acid (EDTA), and wherein the term "Positive tubes/10 tubes" denotes the results obtained in distilled water and hard water against Pseudomonas aeruginosa, the hard water results being typical for waters varying from about 100 p.p.m.–1,000 p.p.m. AOAC hardness:

TABULATION OF RESULTS

| Use dilution level of ortho phenylphenol | Positive tubes/10 tubes Distilled $H_2O$ | Hard $H_2O$ |
|---|---|---|
| 400 p.p.m. and less | 1–10 | 1–10 |
| 450 p.p.m. | 0–1 | 1–10 |
| 500 p.p.m. | 0 | 1–10 |
| 600 p.p.m. | 0 | 1–10 |
| 700 p.p.m. and more | 0 | 0 |

The foregoing relationships can be summarized as follows:

In distilled water, the effect of the phenolics is essentially additive whether or not they contain ortho phenyl phenol;

In hard water at an ortho phenylphenol level of less than 450 p.p.m., the addition of other phenolics has little or no effect in improving performance;

In hard water having an ortho phenylphenol level above 450 p.p.m., the addition of other phenolics improves performance.

The last stated relationship is extremely important. The addition of intermediate activity or high activity phenolics to a product is generally customary since ortho phenylphenol, in itself, exhibits poor performance against Staphylococcus and Salmonella organisms. In formulating compositions containing ortho phenylphenol in combination with a high activity phenolic, it has been found to be economical to utilize a ratio of ortho phenylphenol to high activity phenolics within the above indicated range of 4:1–1.1:1 but preferably from about 2.5:1–1.5:1 so that a use dilution containing, for example, 600 p.p.m. ortho phenylphenol would also preferably contain from about 200–400 p.p.m. of the high activity phenolics and still provide the desired efficacy. Under ordinary conditions, a high activity phenolic present in a use dilution at a level from about 200–300 p.p.m. has been found to be sufficient in combination with ortho phenylphenol, to disinfect against other organisms in addition to Pseudomonas.

For reasons of economy or solubility, the additional phenolics can be selected entirely or partly from the intermediate activity phenolics wherein the weight ratio of ortho phenylphenol to the intermediate phenolics can be from about 2:1–1.25:1.

Representative of the high activity phenolics which can be employed in the present invention are such compounds as 4-chloro-cyclopentylphenol available under the Trademark "Dowicide 9," and 4-chloro-2-benzylphenol available under the Trademark "Santophen-1."

Illustrative of the intermediate activity phenolics which can be employed are such compounds as 4-chloro-2-phenylphenol and 6-chloro-2-phenylphenol which are provided as a mixture available under the Trademark "Dowicide 32," 4-t-amylphenol, 4-n-amylphenol, 2,4-dichloro-3,5-dimethylphenol (DCMX), 4-chloro-3,5-dimethylphenol (PCMX), 5-methyl-2-isopropylphenol and, ortho chloro-p-phenylphenol, available under the Trademark "Dowicide 4."

The phenolic synthetic detergent-disinfectant compositions of the present invention can be formulated to include other conventionally employed components such as solvents, "builders," and the like as is well known to those skilled in the art.

The amount of anionic synthetic detergent which can be incorporated can vary over wide limits from as little as about 0.2 parts per each part of total phenolic to as high as 2 or 3 parts detergent per part of total phenolic.

It is understood that the terms "detergent" and "surfactant," are synonymous and generally refer to materials which have a cleansing action like soap but which are not derived from fatty acids. When the prefix "synthetic" is used with these terms, it is understood to refer to surface active agents which contain structurally unsymmetrical molecules having both a hydrophilic, or water-soluble, group and a hydrophobic, or oil-soluble portion, in which the hydrophilic and/or hydrophobic group was formed by a chemical reaction other than simple saponification.

Similarly, use of the term "anionic" throughout the application and in the appended claims is understood as referring to those detergent, surfactants and surface active agents, such as the aliphatic sulfonates, sulfonates of aliphatic-aromatic hydrocarbons, ester sulfonates, amide sulfonates, and sulfonates containing ether, amino, keto and sulfone groups, as well as those obtained from sulfated fatty alcohols, sulfated fatty condensation products such as sulfated ethoxylated primary or secondary alcohols, and sulfated fatty glycerides, acids, esters, phosphates, and modified carboxylates.

"Builders" can also be incorporated in the phenolic synthetic detergent-disinfectant compositions in order to improve detergency. Examples of such builders are such compounds as tetrapotassium pyrophosphate (TKPP), sodium tripolyphosphate (STP), trisodium or potassium phosphate, sodium carbonate, and the like.

Similarly, solvents such as alcohols, glycols, or low molecular weight glycol ethers can be utilized to improve solubility, freeze-thaw stabilty and like characteristics.

In the present invention, the alkali content of the phenolic synthetic detergent-disinfectant compositions and the pH of the use dilutions are not critical and those skilled in the art will recognize that they can utilize the well-known relationships between the pK values of the phenolics employed and the desirable pH range of the use dilutions. The balance needed to aid in solubilizing the phenolics and the pH efficacy requirements of the use dilution are well known to those skilled in the art. Some pH values or ranges are indicated herein to aid in a clearer understanding of the invention as illustrated in the examples set forth hereinbelow. In general, liquid concentrates which are suitable commercial products will have a pH within the range of about 10 to 13, and will characterically provide at use dilution a pH within the range of about 9 to 10.5.

In addition to the components listed above, the phenolic synthetic detergent-disinfectant compositions of the invention can also have incorporated therein small amounts of dye, perfume, or reducing agents which serve to color, perfume and prevent oxidation of the phenolic composition, the uses of which are well known to those skilled in the art.

As is also well known to those skilled in the art, small amounts of chelating agents can be utilized for their special effect in promoting pseudomonacidal properties of germicidal phenolics in distilled water. For this reason, in some of the examples that follow, small amounts of EDTA are employed as representative of conditions known to the art. EDTA complexes less than its own weight of calcium and magnesium so that, for example, 25 p.p.m. EDTA in use dilution may insure effectiveness in distilled water where only traces of heavy metal cations are found, these cations originating mainly from the bacteria culture itself. However, 25 p.p.m. EDTA has no such demonstrable effect in 100 p.p.m. hard water, and good kills are obtained only when the phenolic synthetic detergent-disinfectant compositions contain the amounts and ratios of phenolics in accordance with the present invention. That is, compositions of this invention are effective in distilled water and in hard waters with or without small amounts of EDTA or other chelating agents.

A clearer understanding of the phenolic synthetic detergent-disinfectant compositions of the present invention will be obtained when considered together with the following examples which are set forth as being nerely illustrative of the invention and are not intended, in any way, to be limitative thereof.

The use dilutions of EXamples I–VI were prepared rom the phenolics of the invention by diluting them in vater. The terms "OPP" denotes ortho phenylphenol, p.p.m." refers to parts per million, "%" refers to the veight percent of the particular component based upon otal weight of the composition prior to dilution, and HW" refers to AOAC hard water. Other than employing small amounts of an alkali to adjust pH and 25 .p.m. EDTA in Examples I–III, no other components r agents were added to the use dilutions so that the esults were obtained on an equal comparative basis. 'he letters in parenthesis identify the use dilution systems in each of the Examples.

EXAMPLE I

UDC test results against Pseudomonas aeruginosa for use dilution having a pH of from about 9.0 to 10.5 nd containing 300 p.p.m. OPP and the indicated mount of additional high activity phenolics or intermediate activity phenolics in 100 p.p.m. and 400 p.p.m. AOAC hard water were determined and are set forth elow in Table 1. In Table 1, the high activity phenolics, Dowicide 9, and Santophen-1, are identified as H–1 nd H–2, respectively, and the intermediate activity henolics, 4-t-amylphenol, Dowicide 32 and DCMX, re identified as I–1, I–2 and I–3, respectively.

TABLE 1

| | Phenolic | Amount phenolic (p.p.m.) | Ratio OPP to phenolic | Positive tubes per 10 tubes 100 p.p.m. HW | 400 p.p.m. HW |
|---|---|---|---|---|---|
| a) | H-1 | 600 | 0.5:1 | 1–10 | 1–10 |
| b) | H-2 | 600 | 0.5:1 | 1–10 | 1–10 |
| c) | I-1 | 600 | 0.5:1 | 1–10 | 1–10 |
| d) | I-2 | 600 | 0.5:1 | 1–10 | 1–10 |
| e) | I-3 | 600 | 0.5:1 | 1–10 | 1–10 |

From the results set forth in Table 1 above, it can be een that when as much as 600 p.p.m. of intermediate ctivity or high activity phenolics are employed, they o not suffice to get pass results when only 300 p.p.m. )PP is employed.

EXAMPLE II

In this example, the pH of the use dilution was again rom about 9.0–10.5, but the OPP level was raised to 00 p.p.m. and combined with the indicated amounts f high activity or intermediate activity phenolics hich are identified in the same manner as in Example above. The results are tabulated below.

TABLE 2

| | Phenolic | Amount phenolic (p.p.m.) | Ratio OPP to phenolic | Positive tubes per 10 tubes 100 p.p.m. HW | 400 p.p.m. HW |
|---|---|---|---|---|---|
| a) | H-4 | 300 | 1.33:1 | 1–10 | 1–10 |
| b) | H-1 | 500 | 0.8:1 | 1–10 | 1–10 |
| c) | H-2 | 300 | 1.33:1 | 1–10 | 1–10 |
| d) | H-2 | 600 | 0.655:1 | 1–10 | 1–10 |
| e) | I-1 | 500 | 0.8:1 | 1–10 | 1–10 |
| f) | I-2 | 300 | 1.33:1 | 1–10 | 1–10 |
| g) | I-2 | 500 | 0.8:1 | 1–10 | 1–10 |
| h) | I-3 | 500 | 0.8:1 | 1–10 | 1–10 |

As can be seen from the results in Table 2, at an OPP level of 400 p.p.m., poor results were obtained even at concentrations of high activity and intermediate activity phenolics which approach the solubility limits of these phenolics.

EXAMPLE III

The results obtained when the level of OPP in the use dilution was raised to 450 p.p.m. and combined with the indicated amounts of high activity or intermediate activity phenolics are set forth below in Table 3 wherein the pH of the use dilution was the same as in Examples I and II and wherein the high activity and intermediate activity phenolics are identified in the same manner as in Example I.

TABLE 3

| | Phenolic | Amount phenolic (p.p.m.) | Ratio OPP to phenolic | Positive tubes per 10 tubes 100 p.p.m. HW | 400 p.p.m. HW |
|---|---|---|---|---|---|
| (a) | H-1 | 200 | 2.25:1 | 1–10 | 1–10 |
| (b) | H-1 | 300 | 1.5:1 | 0–1 | 0–1 |
| (c) | H-1 | 400 | 1.13:1 | 0 | 0 |
| (d) | H-2 | 300 | 1.5:1 | 0–1 | 0–1 |
| (e) | I-1 | 400 | 1.13:1 | 0–1 | 0–1 |
| (f) | I-2 | 400 | 1.13:1 | 0–1 | 0–1 |
| (g) | I-2 | 300 | 1.5:1 | 0–1 | 0–1 |

The results in Table 3 above indicate that good results are obtained only when the level of OPP is raised to 450 p.p.m. and the added phenolics, whether high activity or intermediate activity, are at a level of at least about 300 p.p.m. It is at these minimum levels of OPP and high activity and intermediate activity phenolics that the threshold of effectiveness is reached and it is significant to note that at these levels, the effective weight ratio range of OPP to either the high activity phenolic or the intermediate activity phenolic is the same; that is, 1.13:1–1.5:1. It should be noted that in system (a), wherein the level of high active phenolic and the level of OPP were at their accepted minimum amounts, pass results were not obtained since the use dilution contained less than the minimum level of the sum of the phenolics, but that when the level of high activity phenolic was increased, as shown in system (b) pass results were obtained. Pass results were also obtained when the intermediate activity phenolic was at its minimum level as seen in system (g).

The results set forth in Table 3 were further found to be essentially the same for waters having as little as 50 p.p.m. or as high as 1,000 p.p.m. AOAC hardness.

EXAMPLE IV

In this example, the level of OPP in the use dilution was raised to 500 p.p.m. and combined with the indicated levels of high activity phenolics or intermediate activity phenolics which are identified as in Example I above. The results obtained are shown in Table 4.

TABLE 4

| | Phenolic | Amount phenolic (p.p.m.) | Ratio OPP to phenolic | Positive tubes per 10 tubes 100 p.p.m. HW | 400 p.p.m. HW |
|---|---|---|---|---|---|
| (a) | H-1 | 200 | 2.5:1 | 1–10 | 1–10 |
| (b) | H-1 | 250 | 2:1 | 0–1 | 0–1 |
| (c) | H-1 | 300 | 1.67:1 | 0–1 | 0–1 |
| (d) | H-1 | 400 | 1.25:1 | 0 | 0 |
| (e) | H-2 | 400 | 1.25:1 | 0 | 0 |

TABLE 4-continued

| | Phenolic | Amount phenolic (p.p.m.) | Ratio OPP to phenolic | Positive tubes per 10 tubes 100 p.p.m. HW | 400 p.p.m. HW |
|---|---|---|---|---|---|
| (f) | I-2 | 300 | 1.67:1 | 0–1 | 0–1 |
| (g) | I-2 | 400 | 1.25:1 | 0–1 | 0–1 |
| (h) | I-1 | 450 | 1.11:1 | 0–1 | 0–1 |
| (i) | I-3 | 450 | 1.11:1 | 0–1 | 0–1 |

The results in Table 4 reveal that it was only when the level of the high activity phenolic was increased so that the total phenolics was at 750 p.p.m. that pass results were obtained. It is of interest to note that the effective weight ratio of OPP to high activity phenolics ranged from about 1.25:1–1.67:1 in Table 4 and that the effective weight ratio of OPP to intermediate activity phenolics ranged from about 1.67:1–1.11:1.

EXAMPLE V

The OPP level in this example was raised to 600 p.p.m. and combined with the similarly identified high activity or intermediate activity phenolics as indicated in Table 5.

TABLE 5

| | Phenolic | Amount phenolic (p.p.m.) | Ratio OPP to phenolic | Positive tubes per 10 tubes 100 p.p.m. HW | 400 p.p.m. HW |
|---|---|---|---|---|---|
| (a) | H-1 | 100 | 6:1 | 1–10 | 1–10 |
| (b) | H-1 | 150 | 4:1 | 0–1 | 0–1 |
| (c) | H-1 | 200 | 3:1 | 0–1 | 0–1 |
| (d) | H-1 | 300 | 2:1 | 0 | 0 |
| (e) | H-2 | 300 | 2:1 | 0 | 0 |
| (f) | H-1 | 300 | 2:1 | 0–1 | 0–1 |
| (g) | I-2 | 200 | 3:1 | 0–1 | 0–1 |
| (h) | I-2 | 300 | 2:1 | 0 | 0 |
| (i) | I-3 | 300 | 2:1 | 0–1 | 0–1 |

As seen from the results in Table 5 above, when the OPP is at a level of 600 p.p.m. and the high activity phenolics are at a level less than 150 p.p.m., as shown in system (a), the results obtained are poor. However, when the level of high activity phenolics is raised to at least 150 p.p.m., good results are obtained as can be seen in system (b). Hence, it appears as though a secondary threshold of effectiveness is reached when the use dilution contains a minimum of 600 p.p.m. OPP and 150 p.p.m. high activity phenolics. A corresponding relationship is also obtained with the intermediate activity phenolics.

In a further test, a use dilution containing 550 p.p.m. OPP and 200 p.p.m. H–1 was found to yield pass results equivalent to systems (b) and (c) above.

EXAMPLE VI

In this example, the level of OPP was raised to 700 p.p.m. and combined with high activity phenolics and a combination of high activity and intermediate activity phenolics as identified above, producing the results shown below in Table 6. The pH of the use dilutions was from about 9.0–10.5.

TABLE 6

| | Phenolic | Amount phenolic (p.p.m.) | Ratio OPP to phenolic | Positive tubes per 10 tubes 100 p.p.m. HW | 400 p.p.m. HW |
|---|---|---|---|---|---|
| (a) | H-1 | 250 | 2.8:1 | 0 | 0 |
| (b) | H-2 | 250 | 2.8:1 | 0 | 0 |
| (c) | I-1 | 200 | 1.75:1 | 0 | 0 |
| | H-1 | 200 | | | |

As described earlier, selection of a proper type of surface active agent is important when it is desired to include a surface active agent in a use dilution formulation containing the phenolics of the invention. Example VII is set forth below to demonstrate the different results that are obtained when a soap is employed as the only surface active agent as opposed to the use of a synthetic detergent as the only surface active agent.

As is known to those skilled in the art and as employed herein, the term "soap" refers to any salt of a fatty acid usually, obtained by saponification of a vegetable oil with caustic soda, such as sodium, potassium and ammonium salts of lauric, myristic, palmitic, stearic, oleic, linoleic and ricinoleic acids.

EXAMPLE VII

Two use dilution formulations were prepared containing equal amounts of OPP, intermediate activity phenolic and solvent. In one formulation, a soap was employed as the surface active agent while the other formulation contained a synthetic detergent. Each formulation was diluted with distilled water and with hard water and then tested for activity against Pseudomonas aeruginosa according to the UDC test. The formulations and the results obtained from the UDC test are set forth below in Table 7. In Table 7, the phenolics employed are identified as in Example I, the "soap" employed was potassium ricinoleate, the term "Dowfax 2A1" is the trademark designation for an anionic synthetic detergent consisting essentially of disodium dodecyldiphenyloxide disulfonate, the amounts of the components are given in percent by weight based upon the total weight of the formulations, the term "dilution factor" denotes the ratio of dilution based upon one part of the total components per parts of water, and the terms "A" and "B" identify the formulations. Sufficient water was added to each formulation to bring the total weight of the formulations to 100% and a trace of alkali was added to formulation B to aid in solubilizing the phenolics.

TABLE 7

| | Formulation A | B |
|---|---|---|
| Components: | | |
| OPP (ortho phenylphenol) | 15.0 | 15.0 |
| 1-4(4-t-amylphenol) | 6.3 | 6.3 |
| Soap (potassium ricinoleate) | 44.0 | |
| Dowfax 2A1 (45% active) | | 15.0 |
| Solvent (isopropyl alcohol) | 4.7 | 4.7 |
| Dilution factor | 200 | 200 |
| pH: | | |
| Distilled $H^2O$ | 9.0 | 10.1 |
| 100 p.p.m. HW | 8.9 | 10.0 |
| Positive tubes/10 tubes: | | |
| Distilled $H^2O$ | 0 | 0 |
| 100 p.p.m. HW | 1–10 | 0 |

The results set forth in Table 7 above reveal that both rmulations gave good results when diluted with disled water. However, when 100 p.p.m. AOAC hard ıter was employed as the dilution medium, formula-ın A failed while formulation B exhibited pass results.

other tests utilizing mixtures of soap and synthetic tergent as the surface active agents, it was found that long as the formulation contained a predominance of ionic synthetic detergent, some soap could be toler-ɜd Preferably, however, the formulation should be bstantially free of soap.

In all of the systems set forth in Examples III–VI ove, it is of paramount significance to note that when ɜ minimum levels of OPP and high activity and/or ermediate activity phenolics is established, the sys-ns were indifferent to the level of hardness in the ıter.

As indicated above, the phenolics of the invention n be utilized to obtain use dilutions having the con-ntrations desired or required by the user. Typical rmulations are illustrated below in Table 8 wherein ɜ pH of the use dilutions did not exceed 10.5 and the ıounts of the components are given in percent by ight based upon the total weight of the formulations. ıe terms employed in Table 8 are identified as fol-ws: "Dowfax 2A1" denotes a commercially available ionic surface active agent as previously identified in ample VII; "NTA, $NA_3$" denotes nitrilotriacetic id, trisodium salt; "SLS" denotes sodium lauryl sul-e; "DBS" denotes dodecylbenzene sulfonate; "dilu-ın factor" denotes the recommended dilution of the enolic composition; and, "OPP," "H–1" "H–2", -1", and "I–2" are as identified hereinabove. In each rmulation, sufficient water was added to bring the al weight of the formulations to 100%.

TABLE 8

[Typical formulations]

| mponent | Percent by weight/formulations 1 | 2 | 3 | 4 | 5 | 6 | 7 | 8 | 9 | 10 | 11 |
|---|---|---|---|---|---|---|---|---|---|---|---|
| enolics: | | | | | | | | | | | |
| )PP | 15 | 18 | 18 | 15 | 15 | 15 | 7.5 | 14 | 14 | 14 | 5 |
| H-1 | 6 | 7 | | 5.9 | 6 | | 2.9 | | | | |
| H-2 | | | 7 | | | 6.3 | | 7.5 | 8.5 | | |
| -1 | | | | 2.5 | | 2.5 | 1.25 | 2.0 | 2.0 | | 0.8 |
| -2 | | | | | | | | | | 12 | 4.7 |
| face active agents: | | | | | | | | | | | |
| )owfax 2Al | 7 | 8.5 | 8.5 | 4.5 | 6.5 | 4.5 | 4.5 | 8.1 | 6.8 | 6.8 | 4.5 |
| LS | 3 | | | | 3.5 | 4.0 | 1.0 | | 2.1 | | |
| )BS | | 1.5 | 1.5 | 2.0 | | | | | | 2.0 | |
| elating agents: | | | | | | | | | | | |
| NTA, $Na_3$ | | | | | | | | | | 1.0 | |
| EDTA | 3.3 | 3.3 | 3.3 | 3.3 | 2.5 | 0.8 | 0.4 | 1.0 | 1.0 | | 1.0 |
| ali: NaOH | 3.0 | 3.5 | 3.7 | 3.6 | 3.3 | 3.2 | 1.4 | 3.0 | 2.6 | 2.8 | 1.4 |
| vents: | | | | | | | | | | | |
| sopropanol | 10 | 10 | 10 | 5 | | 10 | 10 | 10 | | | 5 |
| lexylene glycol | | | | | | | 5.0 | | 10 | | |
| ıer additives: | | | | | | | | | | | |
| odium sulfite | | 0.5 | 0.5 | 0.5 | 0.5 | 0.5 | 0.25 | 0.6 | 0.6 | 0.5 | 0.5 |
| odium xylene sulfonate | | | | | | | | | | 4 | |
| erfume | | 0.3 | 0.4 | 0.3 | 0.3 | 0.3 | 0.2 | | | 0.2 | |
| )ye | | .002 | .002 | .001 | .001 | .001 | .001 | | | .001 | |
| ution factor | 256 | 256 | 256 | 256 | 256 | 256 | 128 | 256 | 256 | 256 | 100 |

All of the formulations listed in Table 8 above were ınd to give pass results against S. aureus, S. cholerae-ıs and Pseudomonas aeruginosa.

As indicated by the typical formulations in Table 8 ove, phenolic compositions are almost always rec-ımended for dilution with water when intended for ɜ as disinfectants and some of the more common ution factors are shown in Table 8. In addition to ɜse, dilution factors of 1:64 and 1:200 are also rec-ımended. These dilution factors derive from the ratio of phenolic composition to water, usually expressed in terms of an ounce of phenolic composition per multiple of ounces in a gallon of water. Of the above dilution factors, those of 1:64, 1:128 and 1:256 are generally recommended with greater frequency than the others.

When these dilution factors are considered together with the ratio range of ortho phenylphenol to high and/or intermediate activity phenolics; that is, from about 4:1 to 1.11:1, the phenolic compositions of the invention can then be expressed in terms of percent by weight in resultant products. This is illustrated in Table 9 below wherein representative phenolic composition contents for typical use dilution products at the indicated ratios and dilutions factors are shown. In Table 9, the total of high activity and/or intermediate activity phenolics employed are not specifically identified but are generally referred to by the term "HAP," as acronym for the expression "higher active phenolics."

TABLE 9

[Representative phenolic contents at typical dilution factors]

| Phenolic content | Ratio of OPP to HAP | Concentration of phenolics in use dilution (p.p.m.) | Percent by weight phenolic content at recommended use dilution factors 1:64 | 1:128 | 1:256 |
|---|---|---|---|---|---|
| OPP | 1.11 | 450 | 2.88 | 5.76 | 11.52 |
| HAP | 1 | 410 | 2.64 | 5.28 | 10.56 |
| OPP | 2 | 500 | 3.2 | 6.4 | 12.8 |
| HAP | 1 | 250 | 1.6 | 3.2 | 6.4 |
| OPP | 4 | 800 | 5.12 | 10.24 | 29.48 |
| HAP | 1 | 200 | 1.28 | 2.56 | 5.12 |

From the data shown in Table 9, it will be seen that the lower ratio limit of ortho phenylphenol to high and/or intermediate activity phenolics of 1.11:1 falls well within the minimum amount needed in a use dilution product to obtain pass results (see Example III above). It may be possible to enhance the strength of the product by increasing the total content of high and/or intermediate activity phenolics while maintaining the same level of ortho phenylphenol. However, this should be undertaken after considering the following factors:

High and intermediate activity phenolics are characteristically less soluble in water than ortho phenylphenol. Therefore, increasing the content of high and/or intermediate activity phenolics would result in corresponding difficulty to obtain a use dilution product in which the entire phenolic composition is dissolved.

Water solubility of increased amounts of high and/or intermediate activity phenolics can be enhanced by utilizing greater amounts of detergent and/or alkali in the use dilution product. However, it is known that large amounts of detergent and/or alkali in phenolic products are detrimental to the germicidal activity of the phenolics.

Increasing the content of high and/or intermediate activity phenolics also increases the toxicity of the phenolic composition as well as the resultant use dilution products and also unnecessarily adds to the product cost.

In view of the above facts and since the lower ratio limit of OPP to HAP of 1.11:1 provides pass results in a use dilution product at minimum phenolic levels, this lower ratio limit is recommended.

The upper ratio of OPP to HAP of 4:1 is also based on similar, practical considerations. Increasing the OPP to HAP ratio above 4:1 does not enhance germicidal performance but serves to only increase costs and the toxicity of the phenolic compositions and use dilution products. Furthermore, Table 9 above reveals that use dilution products having a dilution factor 1:256 require an active total phenolic content of about 25% by weight at the upper ratio limit of 4:1 in the phenolic composition. In effect, this upper ratio limit represents the upper limit of practicability for formulating use dilution products. Increasing the phenolic content of use dilutions at the 1:256 dilution factor level is not recommended since the corresponding amount of detergent needed to entirely solubilize the phenolics cannot be added to the use dilution. When the amount of detergent necessary to solubilize increased amounts of phenolics was added to the use dilution part of the phenolic composition was found to settle out of solution after storage within a portion of the normal storage temperature range of from about 15° to 120° F.

The median ratio of OPP to HAP of 2:1 has been included in Table 9 as representative of the most usual ratio that will most probably be employed to provide commercial products.

EXAMPLE VIII

To further illustrate the representative data shown in Table 9 above, additional phenolic compositions were prepared and use dilutions formulated with them which were then subjected to the UDC test. In order to further illustrate that it is the phenolic content that is effective in the UDC test and not other ingredients which can be added as desired by a formulator, such as chelating agents, solvents, builders, reducing agents and the like, a simplified formulation was used. In addition to the phenolic compositions of the invention, therefore, the formulated use dilution products also contained the following ingredients:

(1) As an anionic surface active agent, "Dowfax 2A1," as identified in Example VII, in an amount equal to the total weight of the phenolics employed.

(2) Isopropyl alcohol in an amount of 15% by weight based upon the total weight of the composition.

(3) Sodium hydroxide in an amount sufficient to provide a pH of from about pH 9.5 to pH 10.3 in the use dilution.

Despite the simplicity of the above-described formulation, it will be appreciated by those skilled in the art that the amount and type of surface active agent can be varied as well as utilizing combinations of different surface active agents. Similarly the type and amount of alcohol employed is also not critical and can be eliminated or augmented as desired. This is equally true of the alkali utilized to provide a desired or required pH level in the use dilution.

The phenolic compositions employed to obtain use dilutions from the above formulation are set forth in Table 10 wherein the high activity and intermediate activity phenolics employed are identified a in Examples I–VII above. Additional intermediate activity phenolics were also used and these are identified as "I–4," "I–5," "I–6," and "I–7" for 4-n-amylphenol, 4-chloro-3,5-dimethylphenol, 5-methyl-2-isopropylphenol, and ortho chloro-p-phenylphenol, respectively.

In Table 10 there is also shown the weight percent of ortho phenylphenol and the weight percent of the total high and/or intermediate activity phenolics present in each use dilution, the dilution factor of each use dilution, and the UDC test results obtained in the same manner as in EXamples I–VII above.

TABLE 10

[UDC test results at typical use dilution factor levels]

| | content | Phenolic in by weight) | dilution | Positive)bu HWt |
|---|---|---|---|---|
| (1) | OPP | 11.52 | 1:256 | 0 |
| | H-1 | 10.56 | | |
| (2) | OPP | 11.52 | 1:256 | 0 |
| | H-2 | 10.56 | | |
| (3) | OPP | 11.52 | 1:256 | 0–1 |
| | I-2 | 10.56 | | |
| (4) | OPP | 11.52 | 1:256 | 0–1 |
| | I-1 | 10.56 | | |
| (5) | OPP | 11.52 | 1:256 | 0–1 |
| | I-4 | 10.56 | | |
| (6) | OPP | 11.52 | 1:256 | 0–1 |
| | I-3 | 10.56 | | |
| (7) | OPP | 11.52 | 1:256 | 0–1 |
| | I-5 | 10.56 | | |
| (8) | OPP | 11.52 | 1:256 | 0–1 |
| | I-6 | 10.56 | | |
| (9) | OPP | 11.52 | 1:256 | 0 |
| | H-2 | 5.28 | | |
| | I-1 | 5.28 | | |
| (10) | OPP | 11.52 | 1:256 | 0–1 |
| | I-2 | 3.52 | | |
| | I-1 | 3.52 | | |
| | I-3 | 3.52 | | |
| (11) | OPP | 6.4 | 1:128 | 0 |
| | H-1 | 3.2 | | |
| (12) | OPP | 6.4 | 1:128 | 0 |
| | H-2 | 3.2 | | |
| (13) | OPP | 6.4 | 1:128 | 0–1 |
| | I-2 | 3.2 | | |
| (14) | OPP | 6.4 | 1:128 | 0–1 |
| | I-1 | 3.2 | | |
| (15) | OPP | 6.4 | 1:128 | 0–1 |
| | I-4 | 3.2 | | |
| (16) | OPP | 6.4 | 1:128 | 0–1 |
| | I-3 | 3.2 | | |
| (17) | OPP | 6.4 | 1:128 | 0–1 |
| | I-5 | 3.2 | | |
| (18) | OPP | 6.4 | 1:128 | 0–1 |
| | I-6 | 3.2 | | |
| (19) | OPP | 6.4 | 1:128 | 0–1 |
| | I-7 | 3.2 | | |
| (20) | OPP | 6.4 | 1:128 | 0 |
| | H-1 | 1.6 | | |
| | I-2 | 1.6 | | |
| (21) | OPP | 5.12 | 1.64 | 0 |
| | H-1 | 1.28 | | |
| (22) | OPP | 5.12 | 1:64 | 0 |
| | H-2 | 1.28 | | |
| (23) | OPP | 5.12 | 1:64 | 0 |
| | I-2 | 1.28 | | |
| (24) | OPP | 5.12 | 1:64 | 0 |
| | I-1 | 1.28 | | |

TABLE 10-continued

[UDC test results at typical use dilution factor levels]

| | content | Phenolic in by weight) | dilution | Positive)bu HWt |
|---|---|---|---|---|
| !5) | OPP<br>I-4 | 5.12<br>1.28 | 1:64 | 0 |
| !6) | OPP<br>I-3 | 5.12<br>1.28 | 1:64 | 0 |
| !7) | OPP<br>I-5 | 5.12<br>1.28 | 1:64 | 0 |
| !8) | OPP<br>I-6 | 5.12<br>1.28 | 1:64 | 0 |
| !9) | OPP<br>H-1<br>H-2 | 5.12<br>0.64<br>0.64 | 1:64 | 0 |

As can be seen from the results tabulated in Table 10 ɔove, satisfactory results were obtained in each in-ance.

It should be understood, and will be recognized by ıose skilled in the art, that the phenolics of the inven-ɔn can be prepared in powdered form wherein the nounts of ortho phenylphenol and total phenolics as ell as the weight ratios of ortho phenylphenol to high :tivity and intermediate activity phenolics will be the ıme. When prepared in powdered form, the diluents nployed will be salts rather than water. Powdered ıenolic compositions of the invention can be obtained om liquid preparations by spray-drying the liquid reparation or by spray-drying selected components of liquid preparation and then blending them with ap-ropriate salts. The powdered products obtained can ıen be packaged as pre-determined units in dissolv-ɔle plastic bags, such as polyvinyl-alcohol bags, and ıe bag and its contents added to the desired or re-ıired amount of water, whereupon the bag and its ɔntents will dissolve. Alternatively, the individual dry ɔmponents can be blended to give the desired nounts and ratios of phenolics.

What is claimed is:

1. A phenolic synthetic detergent-disinfectant com-ɔsition comprising an aqueous alkaline solution hav-ıg a pH of about 10 to 13 and containing a mixture of henolics and at least 0.2 parts, per part by weight of ıid phenolic mixture, of anionic synthetic surface :tive agent, said phenolic mixture consisting essen-ally of ortho phenylphenol in the amount of at least ɔout 5% by weight of said composition and the bal-ıce of the other phenolics in said mixture being a ıember selected from the group consisting of *the high :tivity phenolics* 4-chloro-2-cyclopentylphenol, *and* -chloro-2-benzylphenol, *the intermediate activity phe-ɔlics* 4-chloro-2-phenylphenol [y], 6-chloro-2-henylphenol, 4-[5] *t*-amylphenol, 4-n-amylphenol, ,4-dichloro-3,5-dimethylphenol, 4-chloro-3,5-dime-ıylphenol, 5-methyl-2-isopropylphenol, *and* ortho ıloro-p-phenylphenol, and mixtures thereof, the eight ratio of ortho phenylphenol to said other phe-ɔlics being from about [4:1 to 1.1:1] *2.5:1 to 1.5:1 hen said other phenolics include only high activity henolics, from about 2:1 to 1.25:1 when said other henolics include only intermediate activity phenolics, nd being proportioned between these limits when said 'her phenolics are mixtures of high and intermediate :tivity phenolics according to the relative amounts of ıch.*

2. The phenolic synthetic detergent-disinfectant composition of claim 1 wherein the balance of said phenolic mixture is 4-chloro-2-cyclopentylphenol.

3. The phenolic synthetic detergent-disinfectant composition of claim 1 wherein the balance of said phenolic mixture is 4-chloro-2-benzylphenol.

4. The phenolic synthetic detergent-disinfectant composition of claim 1 wherein the balance of said phenolic mixture is a mixture of 4-chloro-2-phenylphenol and 6-chloro-2-phenylphenol.

5. The phenolic synthetic detergent-disinfectant composition of claim 1 wherein the balance of said phenolic mixture is 4-t-amylphenol.

[6. The phenolic synthetic detergent-disinfectant composition of claim 1 wherein the ratio of ortho phenylphenol to the other phenolics is from about 2.5:1.5:1.]

7. The phenolic synthetic detergent-disinfectant composition of claim 1 wherein the phenolic mixture is in powdered form.

8. The phenolic synthetic detergent-disinfectant composition of claim 1 wherein the anionic synthetic surface active agent is selected from the group consisting of aliphatic sulfonates, sulfonates of aliphatic-aromatic hydrocarbons, ester sulfonates, amide sulfonates, and sulfonates containing ether, amino, keto and sulfone groups, as well as those obtained from sulfated fatty alcohols, sulfated fatty condensation products such as sulfated ethoxylated primary or secondary alcohols, and sulfated fatty glycerides, acids, esters, phosphates, and modified carboxylates, and mixtures thereof.

9. A germicidal use solution comprising a mixture of phenolics and at least 0.2 parts, per part by weight of said phenolic mixture, of anionic surface active agent, diluted with water, including water having a hardness as high as about 1,000 p.p.m., in an amount to provide in said use solution at least about 750 p.p.m. of said mixture of phenolics, said phenolic mixture consisting essentially of ortho phenylphenol and the balance of the other phenolics in said mixture being a member selected from the group consisting of *the high activity phenolics* 4-chloro-2-cyclopentylphenol, *and* 4-chloro-2-benzylphenol, *the intermediate activity phenolics* 4-chloro-2-phenylphenol, 6-chloro-2-phenylphenol, 4-[5] *t*-amylphenol, 4-n-amylphenol, 2,4-dichloro-3,5-dimethylphenol, 4-chloro-3,5-dimethylphenol, 5-methyl-2-isopropylphenol, *and* ortho chloro-p-phenylphenol, and mixtures thereof, the weight ratio of ortho phenylphenol to said other phenolics being from about 4:1 to 1.1:1 *when said other phenolics include high activity phenolics, and being from about 2:1 to 1.25:1 when said other phenolics include only intermediate activity phenolics*, and said use solution containing at least about 450 p.p.m. of ortho phenylphenol.

10. A germicidal use solution as defined in claim 9 wherein the balance of said phenolic mixture is 4-chloro-2-cyclopentylphenol.

11. A germicidal use solution as defined in claim 9 wherein the balance of said phenolic misture is 4-chloro-2-benzylphenol.

12. A germicidal use solution as defined in claim 9 wherein the balance of said phenolic mixture is a mixture of 4-chloro-2-phenylphenol and 6-chloro-2-phenylphenol.

13. A germicidal use solution as defined in claim 9 wherein the balance of said phenolic mixture is 4-t-amylphenol.

14. A germicidal use solution as defined in claim 9 wherein the ortho phenylphenol is present in an amount of at least about 600 p.p.m.

15. A germicidal use solution as defined in claim 9 wherein *the other phenolic is a high activity phenolic, and* the ratio of ortho phenylphenol to the other phenolics is from about 2.5:1 to 1.5:1.

16. A germicidal use solution as defined in claim 9 wherein said synthetic anionic surface active agent is selected from the group consisting of aliphatic sulfonates, sulfonates of aliphatic-aromatic hydrocarbons, ester sulfonates, amide sulfonates, and sulfonates containing ether, amino, keto and sulfone groups, as well as those obtained from sulfated fatty alcohols, sulfated fatty condensation products such as sulfated ethyoxylated primary or secondary alcohols, and sulfated fatty glycerides, acids, esters, phosphates, and modified carboxylates, and mixtures thereof.

17. The process of disinfecting surfaces contaminated with Pseudomonas, Staphylococcus and Salmonella organisms and combinations thereof, that comprises applying to such contaminated surfaces a germicidal use solution as defined in claim 9, the disinfecting activity of such use solution, whether prepared in distilled or hard water, being adequate to free stainless steel rings contaminated with said organisms within a 10 minute contact period when tested in conformance with the AOAC "Use Dilution Confirmation Method."

* * * * *